United States Patent
O et al.

(10) Patent No.: US 8,129,469 B2
(45) Date of Patent: *Mar. 6, 2012

(54) GRAFT COPOLYMER, METHOD FOR PREPARING THE SAME AND THERMOPLASTIC RESIN COMPOSITION CONTAINING THE SAME

(75) Inventors: Hyun-taek O, Jeollanam-do (KR); Tae-bin Ahn, Daejeon (KR); Jung-tae Park, Daejeon (KR); Min-jung Kim, Daejeon (KR); Keun-hoon Yoo, Yeosu-si (KR)

(73) Assignee: LG Chem, Ltd. (KR)

(*) Notice: Subject to any disclaimer, the term of this patent is extended or adjusted under 35 U.S.C. 154(b) by 93 days.

This patent is subject to a terminal disclaimer.

(21) Appl. No.: 11/255,472

(22) Filed: Oct. 21, 2005

(65) Prior Publication Data

US 2006/0089462 A1    Apr. 27, 2006

(30) Foreign Application Priority Data

Oct. 22, 2004    (KR) .................. 10-2004-0084994

(51) Int. Cl.
*C08G 63/48* (2006.01)
*C08G 63/91* (2006.01)
*C08F 267/06* (2006.01)
*C08F 255/04* (2006.01)
*C08L 9/00* (2006.01)
*C08L 47/00* (2006.01)
*C08L 51/04* (2006.01)
*C08L 53/00* (2006.01)

(52) U.S. Cl. .............. 525/69; 525/71; 525/83; 525/84; 525/85; 525/309; 525/316; 525/439

(58) Field of Classification Search .............. 525/69, 525/71, 83, 84, 85, 309, 316, 439
See application file for complete search history.

(56) References Cited

U.S. PATENT DOCUMENTS

| 4,224,419 | A |   | 9/1980  | Swoboda et al. ............ 525/71  |
|-----------|---|---|---------|------------------------------------|
| 4,393,172 | A |   | 7/1983  | Lindner et al. ............. 525/310 |
| 4,417,026 | A | * | 11/1983 | Lindner et al. .............. 525/64 |
| 4,902,745 | A | * | 2/1990  | Piejko et al. ................. 525/80 |
| 4,912,162 | A |   | 3/1990  | Kishida et al. ............... 525/67 |
| 5,296,546 | A | * | 3/1994  | Kishida et al. .............. 525/310 |
| 5,336,720 | A | * | 8/1994  | Richards et al. .............. 525/78 |
| 5,932,655 | A |   | 8/1999  | Auclair et al. ................ 525/71 |
| 6,306,961 | B1 | * | 10/2001 | Tone et al. .................... 525/63 |
| 6,492,467 | B1 | * | 12/2002 | Kim et al. ................... 525/316 |
| 6,569,951 | B2 | * | 5/2003  | Eichenauer et al. ......... 525/310 |
| 7,936,510 | B2 | * | 5/2011  | Ahn et al. .................... 349/117 |

FOREIGN PATENT DOCUMENTS

| DE | 1 260 135    | 2/1968  |
|----|--------------|---------|
| EP | 0 534 212 B1 | 3/1993  |
| JP | 59-49245     | 3/1984  |
| JP | 61-296013    | 12/1986 |

* cited by examiner

Primary Examiner — Nathan M Nutter
(74) Attorney, Agent, or Firm — Cantor Colburn LLP

(57) ABSTRACT

The present invention relates to a graft copolymer, a method for preparing the same and a thermoplastic resin composition comprising the same. The graft copolymer of the present invention comprises a composite rubber polymer (A-1) having an average particle diameter of 250-600 nm prepared by particle enlargement after mixing a diene rubber polymer (a-1) latex having an average particle diameter of 50-150 nm and a core-shell structured, cross-linked alkyl acrylate rubber polymer (b-1) latex having an average particle diameter of 50-250 nm. A thermoplastic resin composition prepared by mixing the graft copolymer of the present invention with a hard matrix (B) has very superior weathering resistance and superior pigmentation property, gloss, impact resistance and low-temperature impact strength.

14 Claims, No Drawings

GRAFT COPOLYMER, METHOD FOR PREPARING THE SAME AND THERMOPLASTIC RESIN COMPOSITION CONTAINING THE SAME

CROSS-REFERENCE TO RELATED APPLICATIONS

This application claims the benefit of Korean Patent Application No. 10-2004-0084994, filed on Oct. 22, 2004, in the Korean Intellectual Property Office, the disclosure of which is incorporated herein by reference.

BACKGROUND OF THE INVENTION

1. Field of the Invention

The present invention relates to a novel graft copolymer, a method for preparing the same and a thermoplastic resin composition comprising the same, more particularly to a graft copolymer having superior impact resistance, weathering resistance, gloss and pigmentation property, which is prepared using a composite rubber polymer prepared by particle enlargement after mixing a diene rubber latex and an alkyl acrylate rubber latex, a method for preparing the same and a thermoplastic resin composition comprising the same.

2. Description of Related Art

ABS resin, an acrylonitrile-butadiene-styrene three-component copolymer, is widely used in a variety of fields, including electric, electronic, construction and automobile fields, because of superior impact resistance, rigidity, chemical resistance and processing property. However, ABS resin has weak weathering resistance because it comprises a butadiene polymer, and thus it is inadequate for outdoor use.

To obtain a thermoplastic resin with superior physical properties and good weathering resistance and aging resistance, there should be no ethylenic unsaturated polymer in the graft copolymer. ASA resin (acrylonitrile-styrene-acrylate three-component copolymer) using a cross-linked alkyl acrylate rubber polymer has been confirmed to be a thermoplastic resin having superior weathering resistance and aging resistance. Because of superior weathering resistance and aging resistance, the ASA resin is used in a variety of fields, including automobiles, ships, leisure goods, construction materials and gardenings.

German Patent No. 1,260,135 disclosed a method for preparing an ASA polymer having superior weathering resistance and aging resistance in which a large-diameter latex of cross-linked acrylate having a narrow particle size distribution having an average core particle diameter of 150-800 nm was used. Compared with a polymer prepared using a small-diameter polyacrylate latex, a polymer comprising a large-diameter polyacrylate latex has improved notch impact strength and experiences less contraction. However, the large-diameter graft copolymer has the problem that it is not colored as easily as the small-diameter graft copolymer. Thus, use of the ASA polymer is limited when producing a colored product, giving dull-colored product rather than bright one.

U.S. Pat. No. 4,224,419 disclosed a easily colored thermoplastic resin having good weathering resistance and impact resistance comprising a first graft copolymer prepared from a cross-linked acrylate polymer having an average particle diameter of about 50-150 nm, as core, and styrene and acrylonitrile, as graft shell, a second graft copolymer prepared from a cross-linked acrylate polymer having an average particle diameter of about 200-500 nm, as core, and styrene and acrylonitrile, as graft shell, and a hard component comprising a copolymer of styrene and/or α-methylstyrene with acrylonitrile and, the weight ratio of the core constituents being from about 90:10 to 35:65 and the proportion of the sum of the two core constituents being from about 10-35 wt % based on the total mixture.

European Patent No. 534,212 and U.S. Pat. No. 5,932,655 each disclosed a method of improving pigmentation property and impact resistance by preparing large-diameter and small-diameter graft copolymers and a hard component having a glass transition temperature higher than room temperature, as seed component. European Patent No. 534,212 used the hard seed only in the small-diameter graft copolymer and U.S. Pat. No. 5,932,655 used the hard polystyrene seed in both the large-diameter and the small-diameter graft copolymers.

These materials offer superior weathering resistance and mechanical property with improved pigmentation property. However, the improvement of pigmentation property is not sufficient, as yet. These materials use a cross-linked alkyl acrylate polymer as rubber constituent, which has too small refractive index, compared with styrene or acrylonitrile, to offer vivid color. Further, because the cross-linked alkyl acrylate polymer has a high glass transition temperature, impact strength is not sufficiently high at low temperature.

To overcome these problems, Japanese Patent Laid-Open No. Sho 59-49245 and U.S. Pat. Nos. 4,912,162 and 4,393,172 disclosed methods of using multi-layered alkyl acrylate rubber polymers containing diene rubber polymers. However, because inside layer of the diene polymer is not sufficiently covered by the outside layer of the alkyl acrylate polymer, it is difficult to obtain a resin having superior weathering resistance. Also, cross-linking at the inside layer of the diene polymer during formation of the outside layer of the alkyl acrylate polymer tends to reduce such properties as impact strength.

SUMMARY OF THE INVENTION

Thus, it is an object of the present invention to provide a graft copolymer capable of offering a thermoplastic resin composition having superior impact resistance, weathering resistance, gloss and pigmentation property and a method for preparing the same.

The object of the invention can be attained by the present invention as described hereinbelow.

DETAILED DESCRIPTION OF THE INVENTION

To attain the object, the present invention provides a graft copolymer comprising:

a) 5-60 parts by weight of a composite rubber polymer (A-1) seed prepared by particle enlargement from a diene rubber polymer (a-1) latex and a core-shell structured, cross-linked, alkyl acrylate rubber polymer (b-1) latex;

b) 5-60 parts by weight of an alkyl acrylate monomer; and c) 20-80 parts by weight of at least one monomer selected from a group consisting of an aromatic vinyl compound, a vinyl cyanide compound and an alkyl (meth)acrylate compound per 100 parts by weight of the total monomers.

The invention also provides a method for preparing a graft copolymer comprising the steps of:

(i) preparing a composite rubber polymer (A-1) by particle enlargement after mixing 20-80 parts by weight (based on solid content) of a diene rubber polymer (a-1) latex and 20-80 parts by weight (based on solid content) of a core-shell structured, cross-linked alkyl acrylate rubber polymer (b-1) latex per 100 parts by weight of the total monomers;

(ii) polymerizing 5-60 parts by weight of an alkyl acrylate monomer in the presence of 5-60 parts by weight (based on solid content) of the composite rubber polymer (A-1) seed per 100 parts by weight of the total monomers to prepare an acrylic rubber polymer; and (iii) graft polymerizing 20-80 parts by weight of a monomer selected from a group consisting of an aromatic vinyl compound, a vinyl cyanide compound and an alkyl (meth)acrylate compound with the acrylic rubber polymer prepared in the step (ii).

Hereunder is given a detailed description of the invention.

The present inventors found out that outside layer of an alkyl acrylate polymer does not sufficiently cover inside layer of a diene-based polymer, when graft polymerizing alkyl acrylate monomers in the presence of inside layers of diene-based polymers, because new alkyl acrylate polymer particles are formed failing to form the structure of an inside diene-based polymer layer and an outside alkyl acrylate polymer layer by graft polymerization of the alkyl acrylate monomer and the diene-based polymer, due to insufficient compatibility of the diene-based polymer with the alkyl acrylate monomer.

Also, they found out that, when graft polymerizing alkyl acrylate monomers in the presence of inside layers of diene-based polymer, the diene-based polymer is cross-linked by unwanted side reactions, thereby greatly reducing such physical properties as impact strength.

In order to solve these problems, the present invention uses a composite rubber polymer (A-1) comprising a diene rubber polymer (a-1) having an average particle diameter of 250-600 nm and a core-shell structured, cross-linked alkyl acrylate rubber polymer (b-1), which is prepared by particle enlargement after mixing 20-80 parts by weight (based on solid content) of a diene rubber polymer (a-1) having an average particle diameter of 50-150 nm and 80-20 parts by weight (based on solid content) of a core-shell structured, cross-linked alkyl acrylate rubber polymer (b-1) having an average particle diameter of 50-250 nm, in the form of latex, per 100 parts by weight of the total monomers, as seed.

The present inventors found out that, when an acrylic rubber polymer prepared from emulsion polymerization of 5-60 parts by weight of an alkyl acrylate monomer comprising a grafting agent and a cross-linking agent is mixed with a hard matrix (B) prepared from emulsion polymerization of 20-80 parts by weight of at least one monomer selected from a group consisting of an aromatic vinyl compound, a vinyl cyanide compound and an alkyl (meth)acrylate in the presence of 5-60 parts by weight (based on solid content) of the composite rubber polymer (A-1) seed per 100 parts by weight of the monomer, a thermoplastic resin having superior pigmentation property, gloss and impact resistance and low residual monomer content while having very superior weathering resistance can be prepared.

If the content of the composite rubber polymer (A-1) seed is below 5 parts by weight, impact strength and pigmentation property worsen. Otherwise, if it exceeds 60 parts by weight, tensile strength decreases and adhesion property worsens, making collection of graft copolymer powder difficult.

The diene rubber polymer used in the invention has an average particle diameter of 50-150 nm and a gel content of 50-95%. The diene rubber polymer is a polymer copolymerized from a diene-based monomer and a monomer copolymerizable with the diene-based monomer. The diene-based monomer may be 1,3-butadiene, isoprene, chloroprene, etc. Particularly, 1,3-butadiene is preferred.

The core-shell structured, cross-linked alkyl acrylate rubber polymer (b-1) used in the invention has an average particle diameter of 50-250 nm and a gel content of 50-95%.

Preferably, the core-shell structured, cross-linked alkyl acrylate polymer comprises a core which comprises an aromatic vinyl compound and is polymerized or copolymerized, and a shell, which is copolymerized from an alkyl acrylate monomer and a cross-linking agent.

The shell portion of the core-shell structured, cross-linked alkyl acrylate polymer should have a glass transition temperature of below −20° C., preferably below −30° C. Glass transition temperature of the alkyl acrylate polymer may be measured, for example, by the DSC method.

For the alkyl acrylate monomer, one having 2 to 8 carbon atoms, preferably 4 to 8 carbon atoms, in the alkyl portion, particularly, butyl acrylate or ethylhexyl acrylate is suitable.

The composite rubber polymer (A-1) used in the invention has an average particle diameter of 250-600 nm and a gel content of 50-95%.

Preferably, aromatic vinyl compound used in the present invention is a styrene monomer derivative. For example, at least one selected from a group consisting of styrene, α-methylstyrene, p-methylstyrene and vinyltoluene may be used. And, preferably, the vinyl cyanide compound used in the present invention is acrylonitrile or ethacrylonitrile. And, the alkyl (meth)acrylate compound may be methyl meth)acrylate or any compound similar to or replaceable with the same.

The hard matrix (B) capable of being melt mixed with the dry powder prepared by the invention comprises a hard polymer forming monomer having a glass transition temperature of at least 60° C. Preferably, at least one monomer of an aromatic vinyl compound, a vinyl cyanide compound, a compound containing a methyl methacrylate derived unit, a polycarbonate polymer forming compound, etc. is used alone or in combination.

The graft copolymer preparation method according to the present invention is described further hereinbelow.

Preparation of Diene Rubber Polymer (a-1) Latex

The diene rubber polymer (a-1) latex may be polymerized from a) 100 parts by weight of diene-based monomer, b) 0.5-4 parts by weight of an emulsifier, c) 0.2-1.5 parts by weight of a polymerization initiator, d) 0.1-2 parts by weight of an electrolyte, e) 0.1-0.5 part by weight of a molecular weight controller and f) 75-250 parts by weight of distilled water.

The diene-based monomer (a) may be, for example, 1,3-butadiene, isoprene, chloroprene, etc., preferably 1,3-butadiene.

The diene-based monomer (a) may be used alone or along with a monomer copolymerizable therewith. The monomer copolymerizable with a) the diene-based monomer may be, for example, an alkyl methacrylate compound, an alkyl acrylate compound, an aromatic vinyl compound, a vinyl cyanide compound, etc.

The emulsifier (b) is not particularly limited, but preferably, for the convenience of preparation of the composite rubber polymer (A-1) by particle enlargement, a fatty acid soap such as sodium or potassium salt of oleic acid, stearic acid, lauric acid and mixed fatty acids or a rosin acid soap such as a bietate is used. The emulsifier may be used alone or in combination.

For the polymerization initiator (c), a water-soluble persulfate such as sodium persulfate or potassium persulfate, an oil-soluble persulfate or peroxy compound such as cumene hydroperoxide, diisopropylbenzene hydroperoxide, azobisisobutylnitrile, t-butyl hydroperoxide, p-menthane hydroperoxide and benzoyl peroxide or an oxidation-reduction initiator can be used.

For the electrolyte (d), at least one of KCl, NaCl, KHCO$_3$, NaHCO$_3$, K$_2$CO$_3$, Na$_2$CO$_3$, KHSO$_3$, NaHSO$_3$, K$_4$P$_2$O$_7$, K$_3$PO$_4$, Na$_3$PO$_4$, K$_2$HPO$_4$, Na$_2$HPO$_4$, etc. may be used alone or in combination.

Preferably, the molecular weight controller (e) is a mercaptan compound.

When preparing the diene rubber polymer (a-1), selection of polymerization temperature and initiator is very important to adjust gel content and swelling index of the rubber latex. Preferably, the above-mentioned components are emulsion polymerized at 65-85° C. for 25-50 hours after being fed at once.

Preferably, the resultant polymerized diene rubber polymer (a-1) latex is a rubber latex having an average particle diameter of 50-150 nm and a gel content of 50-95% and having polybutadiene as main constituent.

Preparation of Core-shell Structured, Cross-linked Alkyl Acrylate Rubber Polymer (b-1) Latex The core-shell structured, cross-linked alkyl acrylate rubber polymer (b-1) latex may be polymerized by preparing a core from polymerization of 1) 5-40 parts by weight of an aromatic vinyl compound, 2) 0-10 parts by weight of a monomer copolymerizable with the aromatic vinyl compound, 3) 0.1-3 parts by weight of an emulsifier, 4) 0.01-1 part by weight of a cross-linking agent, 5) 0.01-1.0 part by weight of a polymerization initiator, 6) 0.01-1 part by weight of an electrolyte 7) and distilled water and preparing a shell from polymerization of 8) 60-95 parts by weight of an alkyl acrylate monomer, 9) 0.4-2 parts by weight of an emulsifier, 10) 0.02-3.0 parts by weight of a cross-linking agent, 11) 0.02-1.5 part by weight of a polymerization initiator, 12) 0.01-1 part by weight of an electrolyte and 13) distilled water, per 100 parts by weight of the total monomers comprising the core-shell structured.

Preferably, the aromatic vinyl compound (1) is a styrene monomer derivative. For example, at least one of styrene, α-methylstyrene, p-methylstyrene, vinyltoluene, etc. may be used.

For the monomer copolymerizable with the aromatic vinyl compound (2), a vinyl cyanide compound such as acrylonitrile, methacrylonitrile, etc. or an alkyl (meth)acrylate compound such as methyl (meth)acrylate, ethyl (meth)acrylate, etc. may be used.

For the alkyl acrylate monomer (8), an alkyl acrylate having 2 to 8 carbon atoms, preferably 4 to 8 carbon atoms, in the alkyl group, particularly butyl acrylate and ethylhexyl acrylate, may be used.

For the emulsifier (3) or (9), the same one used in the preparation of the diene rubber polymer (a-1) latex may be used.

For the cross-linking agent (4) or (10), ethylene glycol dimethacrylate, diethylene glycol dimethacrylate, triethylene glycol dimethacrylate, 1,3-butanediol dimethacrylate, 1,6-bhexanediol dimethacrylate, neopentyl glycol dimethacrylate, trimethylcol propane, trimethacrylate, trimethylol, methane triacrylate, etc. may be used.

For the polymerization initiator (5) or (11) and the electrolyte (6) or (12), the same ones used in the preparation of the diene rubber polymer (a-1) latex may be used.

Preferably, the resultant core-shell structured, cross-linked alkyl acrylate (b-1) latex has an average particle diameter of 50-250 nm and a gel content of 50-95%.

Preparation of Composite Rubber Polymer (A-1) Latex

A composite rubber polymer (A-1) latex having (diene rubber polymer)-(core-shell structured, cross-linked alkyl acrylate rubber polymer) with an average particle diameter of 250-600 nm as main constituent is prepared from particle enlargement by mixing the diene rubber polymer (a-1) latex having an average particle diameter of 50-150 nm and the core-shell structured, cross-linked alkyl acrylate rubber polymer (b-1) latex having an average particle diameter of 50-250 nm.

20-80 parts by weight (based on solid content) of the diene rubber polymer (a-1) and 80-20 parts by weight (based on solid content) of the core-shell structured, cross-linked alkyl acrylate rubber polymer (b-1) are mixed at a latex phase, per 100 parts by weight of the total monomers comprising the composite rubber polymer (A-1), and diluted with an adequate amount of distilled water, so that the solid content becomes 20-50 wt %. To the latex mixture is added 0.1-10 parts by weight of an acidic material for particle enlargement to prepare a composite rubber polymer (A-1) having an average particle diameter of 250-600 nm and a gel content of 50-95%.

If the solid content of the latex diluted with distilled water is higher than the above range, average particle diameter increases after enlargement, but formation of coagulum increases, too. Otherwise, if the solid content is lower, formation of coagulum decreases, but average particle diameter also decreases after enlargement. Accordingly, the preferable solid content of the mixture of the diene rubber polymer (a-1) latex and the core-shell structured, cross-linked alkyl acrylate rubber polymer (b-1) latex, to which an adequate amount of distilled water is added, is 20-50 wt %.

The higher the content of the diene rubber polymer (a-1), weathering resistance decreases but pigmentation property is improved. And, the higher the content of the core-shell structured, cross-linked alkyl acrylate rubber polymer (b-1), weathering resistance is improved, but pigmentation property worsens. To obtain a thermoplastic resin having well-balanced pigmentation property and weathering resistance, it is preferable to use 20-80 parts by weight of the diene rubber polymer (a-1) and 20-80 parts by weight of the core-shell structured, cross-linked alkyl acrylate rubber polymer (b-1) per 100 parts by weight of total monomers comprising the composite rubber polymer.

The acidic material is not particularly limited. For example, hydrochloric acid, sulfuric acid, acetic acid, phosphoric acid, oxalic acid, nitric acid, propionic acid, benzoic acid, formic acid, citric acid, lactic acid, maleic acid, etc. can be used. Also, a copolymer latex containing a monomer having an acidic group can be used for the acidic material. The monomer having an acidic group may be, for example, acrylic acid, methacrylic acid, itachonic acid, maleic acid, fumaric acid, crotonic acid, styrenesulfonic acid, etc.

Content of the acidic material is selected in the range of 0.1-10 parts by weight, depending on the average particle diameter of the composite rubber polymer (A-1).

Preferably, it is added at a concentration of 0.5-10 wt % to prevent it from being coagulated.

Preparation of Graft Copolymer

An acrylic rubber polymer latex prepared by emulsion polymerization at a reaction temperature of 30-85° C. by feeding at once or continuously 5-60 parts by weight of an alkyl acrylate monomer, 0.05-0.5 part by weight of a cross-linking agent, 0.03-0.3 part by weight of a grafting agent, 0.1-2 parts by weight of an emulsifier, 0.02-1.5 parts by weight of a polymerization initiator and distilled water, per 100 parts by weight of the total monomers, in the presence of 5-60 parts by weight (based on solid content) of the composite rubber polymer (A-1).

The alkyl acrylate monomer is an alkyl acrylate having 2 to 8 carbon atoms, preferably 4 to 8 carbon atoms, in the alkyl group, particularly butyl acrylate or ethylhexyl acrylate.

For the emulsifier, an alkyl sulfosuccinate metal salt derivative having 12 to 18 carbon atoms or an alkyl sulfuric acid ester or sulfonate metal salt derivative having 12 to 20 carbon atoms, with pH 3-9, may be used. Specific examples of the alkyl sulfosuccinate metal salt derivative having 12 to 18 carbon atoms are dicyclohexyl sulfosuccinate, dihexyl sulfosuccinate, sodium di-2-ethylhexyl sulfosuccinate, potassium di-2-ethylhexyl sulfosuccinate, sodium dioctyl sulfosuccinate, potassium dioctyl sulfosuccinate, etc. And, specific examples of the alkyl sulfinuric acid ester or sulfonate metal salt derivative having 12 to 20 carbon atoms are sodium lauryl sulfate, sodium dodecyl sulfate, sodium dodecyl benzene sulfate, sodium octadecyl sulfate, sodium oleic sulfate, potassium dodecyl sulfate, potassium octadecyl sulfate, etc.

For the polymerization initiator, the same one used in the preparation of the diene rubber polymer (a-1) latex can be used.

Preferably, the cross-linking agent is comprised in 0.05-0.5 part by weight 100 parts by weight of the total monomers used in preparing the graft copolymer. If the content is below 0.05 part by weight, surface gloss may worsen. Otherwise, if it exceeds 0.5 part by weight, such mechanical property as impact strength may worsen.

For the grafting agent, allyl methacrylate (AMA), triallyl isocyanurate (TAIC), triallylamine (TAA), diallylamine (DAA), etc. may be used.

Preferably, the grafting agent is used in 0.03-0.3 part by weight per 100 parts by weight of the total monomers used in the preparation of the graft copolymer. If the content is below 0.03 part by weight, such outer appearance as surface gloss of the final product may worsen. Otherwise, if it exceeds 0.3 part by weight, such mechanical property as impact strength may worsen.

In the presence of the polymerized acrylic rubber polymer latex, 20-80 parts by weight of at least one monomer selected from an aromatic vinyl compound, a vinyl cyanide compound and an alkyl (meth)acrylate, 0.5-3 parts by weight of an emulsifier, 0.02-2 parts by weight of a polymerization initiator, 0.01-0.7 part by weight of a molecular weight controller and distilled water, per 100 parts by weight of the total monomers, are fed at once or continuously for 2-7 hours at 40-85° C. to obtain a graft copolymer by emulsion polymerization.

For the polymerization initiator, the same one used in the preparation of the diene rubber polymer (a-1) latex may be used.

The emulsifier is not particularly limited, but one offering superior latex stability and good polymerization yield during emulsion polymerization, such as an alkyl aryl sulfonate, an alkali methyl alkyl sulfate, a sulfonated alkyl ester, a fatty acid soap, an alkali salt of rosin acid, etc. may be used. The emulsifier may be used alone or in combination.

The molecular weight controller is used to control molecular weight of the graft polymer. Preferably, t-dodecyl mercaptan is used.

To the resultant ASA graft copolymer are added an antioxidant and a stabilizer. Then, the graft copolymer is added to an aqueous solution of an inorganic salt, such as aluminum hydroxide, sodium sulfate, sodium nitrate, calcium chloride, etc., or an aqueous solution of a flocculation agent, such as sulfuric acid, hydrochloric acid, etc. at 50-120° C. to recover wet graft copolymer powder. The wet powder is dehydrated and dried to obtain a graft copolymer (A) in a dry powder form.

The resultant dry graft copolymer powder is used as mixed with a hard matrix (B) comprising a different thermoplastic resin depending on use by a conventional mixing apparatus.

The hard matrix (B) melt mixable with the dry powder is not particularly limited, but preferably, at least one hard polycarbonate polymerizing monomer having a glass transition temperature of at least 60° C. selected from an aromatic vinyl compound, a vinyl cyanide compound and a compound having a methyl methacrylate derived unit is used. For example, poly(methyl methacrylate), acrylonitrile styrene copolymer, acrylonitrile butadiene styrene copolymer, acrylonitrile ethylene propylene diene styrene copolymer, polycarbonate resin, polybutylene terephthalate, polyethylene terephthalate, polyvinyl chloride, polystyrene, methyl methacrylate styrene copolymer, acrylonitrile styrene methyl methacrylate copolymer, polyacetal resin, polyphenylene ether, polyamide resin, etc. can be used. Contents of the (A) and the hard matrix (B) are not particularly limited, but preferably, the graft copolymer (A) is comprised in 10-90 parts by weight and the hard matrix (B) is comprised in 90-10 parts by weight, per 100 parts by weight of the thermoplastic resin composition.

Melt mixing of the graft copolymer (A) and the hard matrix (B) may be performed with an extruder, Banbury mixer, pressure kneader, etc. And, if required, a dye, pigment, oxidation stabilizer, UV stabilizer, modifier, filler, fire retardant, foaming agent, lubricant, plasticizer, etc. may be added.

Hereinafter, the present invention is described in further detail with reference to the examples. However, the following examples are only for the understanding of the invention and the invention is not limited to or by them.

EXAMPLES

In the following examples, average particle diameter of the latex was measured by dynamic laser light scattering using an intensity Gaussian distribution (Nicomp 370HPL).

Example 1

Preparation of Diene Rubber Polymer (a-1) Latex

Into a polymerization reactor (autoclave) substituted with nitrogen were added 100 parts by weight of 1,3-butadiene, 1.5 parts by weight of potassium rosinate and 1.5 parts by weight of potassium oleate, as emulsifier, 0.3 part by weight of sodium carbonate ($Na_2CO_3$), as electrolyte, 0.3 part by weight of t-dodecylmercaptan (TDDM), as molecular weight controller, and 100 parts by weight of distilled water at once. After heating to the reaction temperature of 65° C., 0.5 part by weight of potassium persulfate was added as initiator. After the reaction was initiated, the reactor was continuously heated to 75° C. for 18 hours. The resultant diene rubber polymer (a-1) latex had an average particle diameter of 110 nm and a gel content of 91%.

Preparation of Core-shell Structured Cross-linked Alkyl Acrylate Rubber Polymer (b-1) Latex Into a polymerization reactor substituted with nitrogen were added 20 parts by weight of styrene, 0.5 part by weight of potassium rosinate and 0.5 part by weight of potassium oleate, as emulsifier, 0.2 part by weight of ethylene glycol dimethacrylate, 0.2 part by weight of sodium bicarbonate and 100 parts by weight of distilled water at once. After heating to the reaction temperature of 70° C., 0.05 part by weight of potassium persulfate was added as initiator. After 1 hour of reaction, a mixture of 80 parts by weight of butyl acrylate, 0.5 part by weight of potassium rosinate, 0.5 part by weight of potassium oleate, 0.2 part by weight of ethylene glycol dimethacrylate, 50 parts by weight of distilled water and 0.05 part by weight of potassium persulfate was added. Reaction was performed for another hour to obtain a core-shell structured, cross-linked alkyl acrylate rubber polymer (b-1) latex.

The resultant core-shell structured, cross-linked alkyl acrylate rubber polymer (b-1) latex had an average particle diameter of 130 nm and a gel content of 90%.

Preparation of Composite Rubber Polymer (A-1) Latex 50 parts by weight (based on solid content) of the diene rubber polymer (a-1) and 50 parts by weight (based on solid content) of the core-shell structured, cross-linked alkyl acrylate rubber polymer (b-1), per 100 parts by weight of the total monomers comprising the composite rubber polymer (A-1) to be prepared, were mixed in a reactor in a latex phase. After diluting to a solid content of 35% by adding 67 parts by weight of distilled water, the mixture was stirred at a rate of 10 rpm at 30° C. while slowly adding 3.5 parts by weight of a 7% aqueous acetic acid solution for 1 hour. After stopping stirring, the reactor was let alone for 30 minutes to obtain a composite rubber polymer (A-1) latex. The resultant composite rubber polymer (A-1) latex had an average particle diameter of 290 nm and a gel content of 91%

Preparation of Graft Copolymer

A mixture of 30 parts by weight of butyl acrylate, 0.3 part by weight of sodium dodecyl sulfate, 0.1 part by weight of ethylene glycol dimethacrylate, 0.06 part by weight of allyl methacrylate, 0.05 part by weight of potassium persulfate and 13 parts by weight of distilled water was added at 70° C. continuously for 3 hours in the presence of 20 parts by weight (based on solid content) of the composite rubber polymer (A-1), per 100 parts by weight of the total monomers used in preparation of graft copolymer. Polymerization was performed for 1 hour to obtain a rubber polymer latex.

In the presence of the resultant rubber polymer latex, a mixture of 36.5 parts by weight of styrene, 13.5 parts by weight of acrylonitrile, 1.5 part by weight of potassium rosinate, 0.1 part by weight of t-dodecyl mercaptan, 0.15 part by weight of potassium persulfate and 50 parts by weight of distilled water was added at 70° C. continuously for 4 hours. In order to increase polymerization transition ratio, the temperature was increased to 78° C. and reaction was performed for another hour. A graft copolymer was obtained by cooling the inner temperature of the reactor to 60° C.

Transition ratio of the resultant latex was 99.5%.

The obtained latex was flocculated at 85° C. under normal pressure using an aqueous calcium chloride solution, aged at 95° C., dehydrated, washed and dried with hot air of 90° C. to obtain multilayer structured graft copolymer particles.

40 parts by weight of the obtained graft copolymer particles were mixed with 60 parts by weight of styrene-acrylonitrile copolymer (92HR, LG Chem), a hard matrix, 1 part by weight of a lubricant, 0.5 part by weight of an anti-oxidant and 0.5 part by weight of a UV stabilizer, per 100 parts by weight of the total monomers used in the preparation of the graft copolymer. The mixture was processed into a pellet in a cylinder of 220° C. using a 40 φ extrusion mixer. The pellet was injection molded to prepare a sample for physical property test. Izod impact strength, gloss and weathering resistance were measured as follows.

40 parts by weight of the obtained graft copolymer particles were mixed with 60 parts by weight of styrene-acrylonitrile copolymer (92HR, LG Chem), a hard matrix, 1 part by weight of a lubricant, 0.5 part by weight of an anti-oxidant, 0.5 part by weight of a UV stabilizer and 1 part by weight of carbon black. The mixture was processed into a pellet in a cylinder of 220° C. using a 40 φ extrusion mixer. The pellet was injection molded to prepare a sample for pigmentation property test. Pigmentation property was measured as follows.

a) Izod impact strength (¼" notched at 23° C., −20° C. kg·cm/cm)—Measured according to ASTM D256.

b) Gloss (at an angle of 45°)—Measured according to ASTM D528.

c) Weathering resistance—Discoloration (ΔE) was measured with a colorimeter after running water spray cycles at 18 min/120 min in a weatherometer (Ci35A, ATLAS) of 83° C. and then keeping the resin alone for 2000 hours.

Here, ΔE is the arithmetic average of Hunter Lab values before and after the weathering resistance test. The closer the value is to 0, the better is the weathering resistance.

d) Pigmentation property—L value was measured using a colorimeter. The smaller the L value, the lower the brightness, and thus the better the pigmentation property.

Example 2

70 parts by weight (based on solid content) of a diene rubber polymer (a-1) and 30 parts by weight (based on solid content) of a core-shell structured, cross-linked alkyl acrylate rubber polymer (b-1), per 100 parts by weight of the total monomers comprising the composite rubber polymer (A-1) to be prepared, prepared in the same manner as in Example 1 were mixed in a latex phase in a reactor. 77.5 parts by weight of distilled water was added to dilute the mixture to a solid content of 35%. At a stirring rate of 10 rpm and a temperature of 30° C., stirring was performed for 1 hours while slowly adding 3.5 parts by weight of an aqueous 7% acetic acid solution. After stopping the stirring, the mixture was let alone for 30 minutes to obtain a composite rubber polymer (A-1) latex. The resultant composite rubber polymer (A-1) latex had an average particle diameter of 295 nm and a gel content of 91%. Tests were performed in the same manner as in Example 1.

Example 3

To 40 parts by weight (based on solid content) of a composite rubber polymer (A-1) prepared in the same manner as in Example 1, a mixture of 30 parts by weight of butyl acrylate, 0.3 part by weight of sodium dodecyl sulfate, 0.1 part by weight of ethylene glycol dimethacrylate, 0.06 part by weight of allyl methacrylate, 0.05 part by weight of potassium persulfate and 13 parts by weight of distilled water was continuously added for 3 hours at 70° C. Polymerization was performed for another hour to obtain a rubber polymer latex.

To the resultant rubber polymer latex was continuously added a mixture of 21.9 parts by weight of styrene, 8.1 parts by weight of acrylonitrile, 1.0 part by weight of potassium rosinate, 0.07 part by weight of t-dodecyl mercaptan, 0.1 part by weight of potassium persulfate and 30 parts by weight of distilled water for 4 hours at 70° C. In order to increase polymerization transition ratio, reaction was performed for another hour after increasing the temperature to 78° C. Then, temperature inside the reactor was cooled to 60° C. to obtain a graft copolymer. Graft copolymer powders were prepared in the same manner as in Example 1.

28.6 parts by weight of the resultant graft copolymer powders were mixed with 71.4 parts by weight of a styrene-acrylonitrile copolymer (92HR, LG Chem), a hard matrix, 1 part by weight of a lubricant, 0.5 part by weight of an anti-oxidant and 0.5 part by weight of a UV stabilizer. The mixture was processed into a pellet in a cylinder of 220° C. using a 40 φ extrusion mixer. The pellet was injection molded to a sample for physical property test. Izod impact strength, gloss and weathering resistance were measured in the same manner as in Example 1.

28.6 parts by weight of the resultant graft copolymer powders were mixed with 71.4 parts by weight of a styrene-acrylonitrile copolymer (92HR, LG Chem), a hard matrix, 1 part by weight of a lubricant, 0.5 part by weight of an antioxidant, 0.5 part by weight of a UV stabilizer and 1 part by weight of carbon black. The mixture was processed into a pellet in a cylinder of 220° C. using a 40 φ extrusion mixer. The pellet was injection molded to a sample for pigmentation property test. Pigmentation property was measured in the same manner as in Example 1.

Example 4

To 20 parts by weight (based on solid content) of a composite rubber polymer (A-1) prepared in the same manner as in Example 1, a mixture of 50 parts by weight of butyl acrylate, 0.5 part by weight of sodium dodecyl sulfate, 0.17 part by weight of ethylene glycol dimethacrylate, 0.1 part by weight of allyl methacrylate, 0.08 part by weight of potassium persulfate and 33 parts by weight of distilled water was continuously added for 4 hours at 70° C. Polymerization was performed for another hour to obtain a rubber polymer latex.

To the resultant rubber polymer latex was continuously added a mixture of 21.9 parts by weight of styrene, 8.1 parts by weight of acrylonitrile, 1.0 part by weight of potassium rosinate, 0.07 part by weight of t-dodecyl mercaptan, 0.1 part by weight of potassium persulfate and 20 parts by weight of distilled water for 4 hours at 70° C. In order to increase polymerization transition ratio, reaction was performed for another hour after increasing the temperature to 78° C. Then, temperature inside the reactor was cooled to 60° C. to obtain a graft copolymer. Graft copolymer powders were prepared in the same manner as in Example 1.

28.6 parts by weight of the resultant graft copolymer powders were mixed with 71.4 parts by weight of a styrene-acrylonitrile copolymer (92HR, LG Chem), a hard matrix, 1 part by weight of a lubricant, 0.5 part by weight of an antioxidant and 0.5 part by weight of a UV stabilizer. The mixture was processed into a pellet in a cylinder of 220° C. using a 40 φ extrusion mixer. The pellet was injection molded to a sample for physical property test. Izod impact strength, gloss and weathering resistance were measured in the same manner as in Example 1.

28.6 parts by weight of the resultant graft copolymer powders were mixed with 71.4 parts by weight of a styrene-acrylonitrile copolymer (92HR, LG Chem), a hard matrix, 1 part by weight of a lubricant, 0.5 part by weight of an antioxidant, 0.5 part by weight of a UV stabilizer and 1 part by weight of carbon black. The mixture was processed into a pellet in a cylinder of 220° C. using a 40 φ extrusion mixer. The pellet was injection molded to a sample for pigmentation property test. Pigmentation property was measured in the same manner as in Example 1.

Comparative Example 1

100 parts by weight (based on solid content) of a diene rubber polymer (a-1) and 0 part by weight (based on solid content) of a core-shell structured, cross-linked alkyl acrylate rubber polymer (b-1), per 100 parts by weight of the total monomers comprising the composite rubber polymer (A-1) to be prepared, which were prepared in the same manner as in Example 1, were mixed in a reactor in a latex phase. The mixture was diluted with 93.5 parts by weight of distilled water to a solid content of 35% and stirred for 1 hour at a stirring rate of 10 rpm and at 30° C. while slowly adding 3.5 parts by weight of an aqueous 7% acetic acid solution. Then, the mixture was let alone for 30 minutes to obtain a composite rubber polymer (A-1) latex. The resultant composite rubber polymer (A-1) latex had an average particle diameter of 310 nm and a gel content of 91%. Tests were performed in the same manner as in Example 1.

Comparative Example 2

0 part by weight (based on solid content) of a diene rubber polymer (a-1) and 100 parts by weight (based on solid content) of a core-shell structured, cross-linked alkyl acrylate rubber polymer (b-1), per 100 parts by weight of the total monomers comprising the composite rubber polymer (A-1) to be prepared, which were prepared in the same manner as in Example 1, were mixed in a reactor in a latex phase. The mixture was diluted with 41 parts by weight of distilled water to a solid content of 35% and stirred for 1 hour at a stirring rate of 10 rpm and at 30° C. while slowly adding 3.5 parts by weight of an aqueous 7% acetic acid solution. Then, the mixture was let alone for 30 minutes to obtain a composite rubber polymer (A-1) latex. The resultant composite rubber polymer (A-1) latex had an average particle diameter of 280 nm and a gel content of 90%. Tests were performed in the same manner as in Example 1.

Comparative Example 3

Procedure of Example 1 was repeated, except for using 20 parts by weight of a composite rubber polymer (A-2) prepared by the following method instead of 20 parts by weight of the composite rubber polymer (A-1), per 100 parts by weight of the total monomers used in the preparation of the graft copolymer.

Preparation of Composite Rubber Polymer (A-2)

Into a polymerization reactor (autoclave) substituted with nitrogen were added 186 parts by weight of distilled water, 50 parts by weight of 1,3-butadiene, 50 parts by weight of butyl acrylate, 0.7 part by weight of potassium rosinate and 0.9 part by weight of potassium oleate, as emulsifier, 0.7 part by weight of sodium carbonate ($Na_2CO_3$) and 0.7 part by weight of potassium bicarbonate ($KHCO_3$), as electrolyte, and 0.3 part by weight of t-dodecylmercaptan (TDDM), as molecular weight controller, at once. After heating to the reaction temperature of 65° C., 0.3 part by weight of potassium persulfate was added as initiator. After the reaction was initiated, the reactor was continuously heated to 85° C. for 35 hours. The resultant composite rubber polymer (A-2) latex had an average particle diameter of 290 nm and a gel content of 90%.

Comparative Example 4

The procedure of Example 1 was repeated, except for using 1.2 part by weight of an aqueous 7% acetic acid solution instead of the aqueous 7% acetic acid solution in the preparation of the composite rubber polymer (A-1) latex. The resultant composite rubber polymer (A-1) latex had an average particle diameter of 190 nm and a gel content of 91%.

TABLE 1

|  | Example 1 | Example 2 | Example 3 | Example 4 | Comp. Example 1 | Comp. Example 2 | Comp. Example 3 | Comp. Example 4 |
| --- | --- | --- | --- | --- | --- | --- | --- | --- |
| Izod impact strength (23° C.) (kgcm/cm) | 29 | 32 | 30 | 28 | 18 | 22 | 21 | 13 |
| Izod impact strength (−20° C.) (kgcm/cm) | 6.5 | 6.9 | 6.5 | 6.2 | 3.8 | 3.0 | 5.1 | 2.6 |
| Gloss | 95 | 97 | 93 | 91 | 78 | 80 | 90 | 98 |
| Weathering resistance | 2.5 | 2.7 | 2.6 | 2.1 | 8.5 | 2.0 | 3.3 | 2.8 |
| Pigmentation property | 17.2 | 17.0 | 17.3 | 17.7 | 16.1 | 20.9 | 17.0 | 16.5 |

As seen in Table 1, the thermoplastic resins comprising the graft copolymers of Examples showed superior weathering resistance, impact resistance, low-temperature impact strength and gloss as well as superior pigmentation property. However, the thermoplastic resin comprising the composite rubber polymer (A-1) of Comparative Example 1, which comprises only the diene rubber polymer (a-1), showed insufficient weathering resistance and impact strength. Also, the thermoplastic resin comprising the composite rubber polymer (A-1) of Comparative Example 2, which comprises only the core-shell structured, cross-linked alkyl acrylate rubber polymer (b-1), showed insufficient impact strength at low temperature and pigmentation property. In Comparative Example 3, impact strength was insufficient. And, in Comparative Example 4, where average particle diameter of the composite rubber polymer is smaller than 250 nm, impact strength was insufficient.

As apparent from the above description, the thermoplastic resin composition comprising the graft copolymer of the present invention not only has superior weathering resistance and pigmentation property but also is capable of improving such properties as impact resistance, gloss, etc. with good balance.

Although the present invention has been described in detail with reference to the preferred embodiments, those skilled in the art will appreciate that various modifications and substitutions can be made thereto without departing from the spirit and scope of the invention as set forth in the appended claims.

What is claimed is:

1. A method for preparing a graft copolymer comprising the steps of
   (i) preparing a composite rubber polymer (A-1) latex having an average particle diameter of 250-600 nm and a gel content of 50-95% by adding 0.1-10 parts by weight of acid solution having a concentration of 0.5-10 wt% after being diluted as a solid content in the range of 20-50 wt% by adding water in a mixture of 20-80 parts by weight based on solid content of a diene rubber polymer (a-1) latex having an average particle diameter of 50-150 rim and 20-80 parts by weight based on solid content of a core-shell structured, cross-linked alkyl acrylate rubber polymer (b-1) latex having an average particle diameter of 50-250 nm per 100 parts by weight of the total monomers comprising the composite rubber polymer (A-1), wherein the core-shell structured, cross-linked alkyl acrylate polymer (b-1) comprises a core polymerized or copolymerized from 5-40 parts by weight of an aromatic vinyl compound and 0-10 parts by weight of a monomer copolymerizable with the aromatic vinyl compound and a shell copolymerized from 60-95 parts by weight of an alkyl acrylate monomer and 0.02-3.0 parts by weight of a cross-linking agent, per 100 parts by weight of the total monomers comprising the core-shell structured, cross-linked alkyl acrylate rubber polymer (b-1);
   (ii) polymerizing 5-60 parts by weight of an alkyl acrylate monomer in the presence of 5-60 parts by weight based on solid content of the above-prepared composite rubber polymer (A-1) latex, per 100 parts by weight of the total monomers comprising the graft copolymer, to obtain an acrylic rubber polymer latex; and
   (iii) graft polymerizing the acrylic rubber polymer latex prepared in the step (ii) with 20-80 parts by weight of at least one monomer selected from a group consisting of an aromatic vinyl compound, a vinyl cyanide compound and an alkyl (meth)acrylate compound, per 100 parts by weight of the total monomers used in preparation of the graft copolymer, to obtain an ASA (acrylonitrile-styrene-acrylate) graft copolymer for thermoplastic resin composition having impact strength at low temperature, pigmentation property, gloss, and weathering resistance.

2. The method of claim 1, the diene rubber polymer (a-1) being copolymerized from a diene-based monomer and a monomer copolymerizable with the diene- based monomer.

3. The method of claim 1, the diene rubber polymer (a-1) having a gel content of 50-95%.

4. The method of claim 1, the core-shell structured, cross-linked alkyl acrylate rubber polymer (b-1) being polymerized from an alkyl acrylate monomer having 4 to 8 carbon atoms in the alkyl group.

5. The method of claim 1, the core-shell structured, cross-linked alkyl acrylate rubber polymer (b-1) having a gel content of 50-95%.

6. The method of claim 1, the alkyl acrylate being butyl acrylate or ethylhexyl acrylate.

7. The method of claim 2, the diene-based monomer being at least one selected from a group consisting of 1,3-butadiene, isoprene and chloroprene.

8. The method of claim 2, the monomer copolymerizable with the diene-based monomer being at least one selected from a group consisting of an alkyl acrylate compound, an alkyl methacrylate compound, an aromatic vinyl compound and a vinyl cyanide compound.

9. The method of claim 1, the aromatic vinyl compound being at least one selected from a group consisting of styrene, α-methylstyrene, p-methylstyrene and vinyltoluene.

10. The method of claim 1, the vinyl cyanide compound being acrylonitrile or methacrylonitrile.

11. The method of claim 1, the alkyl (meth)acrylate compound being methyl (meth)acrylate.

12. A thermoplastic resin composition having impact strength at low temperature, pigmentation property, gloss, and weathering resistance comprising ASA(acrylonitrile-stytene-acrylate) graft copolymer prepared by the method of claim 1 and a hard matrix (B).

13. The thermoplastic resin composition having impact strength at low temperature, pigmentation property, gloss, and weathering resistance of claim 12, the hard matrix (B) being at least one hard polymer having a glass transition temperature of at least one 60° C. and being made from at least one monomer selected from a group consisting of an aromatic vinyl compound, a vinyl cyanide compound, and methyl methacrylate, or being a polycarbonate polymer.

14. The thermoplastic resin composition having impact strength at low temperature, pigmentation property, gloss, and weathering resistance of claim 12, the hard matrix (B) being used in 90-10 parts by weight per 100 parts by weight of the thermoplastic resin composition.

* * * * *